US 6,541,979 B2

(12) United States Patent
Omeragic

(10) Patent No.: US 6,541,979 B2
(45) Date of Patent: Apr. 1, 2003

(54) MULTI-COIL ELECTROMAGNETIC FOCUSING METHODS AND APPARATUS TO REDUCE BOREHOLE ECCENTRICITY EFFECTS

(75) Inventor: Dzevat Omeragic, Sugar Land, TX (US)

(73) Assignee: Schlumberger Technology Corporation, Houston, TX (US)

(*) Notice: Subject to any disclaimer, the term of this patent is extended or adjusted under 35 U.S.C. 154(b) by 132 days.

(21) Appl. No.: 09/741,593

(22) Filed: Dec. 19, 2000

(65) Prior Publication Data

US 2002/0113592 A1 Aug. 22, 2002

(51) Int. Cl.$^7$ .............................. G01V 3/18; G01V 3/24
(52) U.S. Cl. ....................... 324/339; 324/338; 324/343
(58) Field of Search ................................. 324/338, 339, 324/343, 344, 346, 347, 348, 366, 202

(56) References Cited

U.S. PATENT DOCUMENTS

| 4,319,191 A | 3/1982 | Meador et al. ............ 324/341 |
| 5,041,975 A | 8/1991 | Minerbo et al. ............. 702/7 |
| 5,058,077 A | 10/1991 | Twist ..................... 367/25 |
| 5,115,198 A | 5/1992 | Gianzero et al. ............ 324/339 |
| 5,157,605 A | 10/1992 | Chandler et al. ............. 702/7 |
| 5,235,285 A | 8/1993 | Clark et al. .............. 324/342 |
| 5,260,660 A | * 11/1993 | Stolarczyk ................ 324/338 |
| 5,339,036 A | * 8/1994 | Clark et al. .............. 324/338 |
| 5,339,037 A | 8/1994 | Bonner et al. ............. 324/366 |
| 5,508,616 A | 4/1996 | Sato et al. ................ 324/343 |
| 5,757,191 A | 5/1998 | Gianzero ................ 324/339 |
| 5,781,436 A | 7/1998 | Forgang et al. ............. 702/7 |
| 5,905,379 A | 5/1999 | Orban et al. .............. 324/339 |

FOREIGN PATENT DOCUMENTS

| GB | 2 066 475 A | 7/1981 |
| GB | 2 221 309 A | 1/1990 |
| GB | 2 367 366 A | 4/2002 |

* cited by examiner

Primary Examiner—Edward Lefkowitz
Assistant Examiner—Reena Aurora
(74) Attorney, Agent, or Firm—Victor H. Segura; Brigitte L. Jeffery; John J. Ryberg

(57) ABSTRACT

Methods and apparatus are disclosed for canceling or eliminating borehole eccentricity effects on a formation resistivity measurement obtained with transmitter and/or receiver antennas which are substantially time varying magnetic dipoles with their dipole moments aligned at an angle to the axis of the borehole. Various apparatus are configured with a plurality of antennas having tilted or transverse magnetic dipole moments, at least one current sensor, means for conducting alternating current through one or more of the antennas, and means for calculating a scaling factor from signal measurements and for scaling the alternating current with the factor. One method includes scaling an alternating current and passing said current through one or more antennas to obtain the resistivity measurement. Another method includes calculating scaling factors based on spacings between antennas and/or current sensors disposed on an instrument and passing alternating currents scaled by said factors through one or more antennas to obtain the resistivity measurement. Another embodiment includes inputting a borehole fluid resistivity value to derive the formation resistivity.

29 Claims, 12 Drawing Sheets

MULTI-COIL ELECTROMAGNETIC FOCUSING METHODS AND APPARATUS TO REDUCE BOREHOLE ECCENTRICITY EFFECTS

1. BACKGROUND OF THE INVENTION

1.1 Field of the Invention

The invention relates generally to the field of electromagnetic well logging. More particularly, the invention concerns methods, and devices for their implementation, for reducing and/or correcting for the effects of the borehole on an overall formation resistivity measurement.

1.2 Description of Related Art

Various well logging techniques are known in the field of hydrocarbon exploration and production. These techniques typically employ instruments or "sondes" equipped with sources adapted to emit energy through a borehole traversing the subsurface formation. The emitted energy interacts with the surrounding formation to produce signals that are detected and measured by one or more sensors on the instrument. By processing the detected signal data, a profile of the formation properties is obtained.

Electromagnetic (EM) induction logging is a well-known technique. Induction logging instruments are disposed within a borehole to measure the electrical conductivity (or its converse, resistivity) of earth formations surrounding the borehole. Conventional induction logging instruments are implemented with antennas that are operable as sources and/or sensors. The antennas are mounted on a support or mandrel and spaced from each other along the axis of the support. These antennas are generally coils of the cylindrical solenoid type and are comprised of one or more turns of insulated conductor wire that is wound around the support. U.S. Pat. Nos. 5,157,605 and 5,905,379 (both assigned to the present assignee), for example, describe induction logging instruments equipped with antennas disposed along a support member. In operation, a transmitter antenna is energized by an alternating current to emit EM energy through the borehole fluid (also referred to herein as mud) and into the formation. The signals detected at a receiver antenna are usually expressed as a complex number (phasor voltage) and reflect interaction with the mud and the formation.

FIG. 1 shows a conventional logging instrument 100 forming part of a well logging system. The instrument 100 is adapted for movement through the borehole and coupled to a surface computer 105 by a wireline cable 110. The formation resistivity profile can be determined in real-time by sending the signal data to the surface as they are acquired, or it can be determined from a recorded-mode by recording the data on a suitable recordable medium (not shown) housed within the instrument 100. As known in the art, the signal data are typically transmitted from the instrument 100 to the surface computer 105 by electronics (not shown) housed in the instrument 100. The signal data may be sent to the surface computer along the wireline cable or by alternate telemetry means. Once received by the surface computer 105, the data can be recorded, processed, or computed as desired by the user to generate a formation profile. The profile can then be recorded on a suitable output record medium. Alternatively, some or all of the processing can be performed downhole and the data can be recorded uphole, downhole, or both.

A coil carrying a current can be represented as a magnetic dipole having a magnetic moment proportional to the current and the area encompassed by the coil. The direction and strength of the magnetic dipole moment can be represented by a vector perpendicular to the area encompassed by the coil. In conventional induction and propagation logging instruments, the transmitter and receiver antennas are mounted with their axes along the longitudinal axis of the instrument. Thus, these tools are implemented with antennas having longitudinal magnetic dipoles (LMD). When such an antenna is placed in a borehole and energized to transmit EM energy, currents flow around the antenna in the borehole and in the surrounding formation. There is no net current flow up or down the borehole.

An emerging technique in the field of well logging is the use of instruments incorporating antennas having tilted or transverse coils, i.e., where the coil's axis is not parallel to the longitudinal axis of the support. These instruments are thus implemented with antennas having a transverse or tilted magnetic dipole (TMD). The aim of these TMD configurations is to provide three-dimensional formation evaluation, including information about resistivity anisotropy in vertical wells and directional sensitivity that can be used for navigation. Logging instruments equipped with TMDs are described in U.S. Pat. Nos. 6,147,496, 4,319,191, 5,757,191 and 5,508,616.

A particularly troublesome property of the TMD is the extremely large borehole effect that occurs in high conductivity contrast situations, i.e., when the mud in the borehole is more conductive than the formation. When a TMD is placed in the center of a borehole, there is no net current along the borehole axis. When it is eccentered in a direction parallel to the direction of the magnetic moment, the symmetry of the situation insures that there is still no net current along the borehole axis. However, when a TMD is eccentered in a direction perpendicular to the direction of the magnetic moment, axial currents are induced in the borehole. In high contrast situations these currents can flow for a very long distance along the borehole. When these currents pass by TMD receivers, they can cause signals that are many times larger than would appear in a homogeneous formation without a borehole.

U.S. Pat. No. 5,041,975 (assigned to the present assignee) describes a technique for processing signal data from well logging measurements in an effort to correct for the effects of the borehole. U.S. Pat. No. 5,058,077 describes a technique for processing downhole sensor data in an effort to compensate for the effect of eccentric rotation on the sensor while drilling. U.S. Pat. No. 5,781,436 describes a technique for measuring the conductivity of earth formations by making subsurface EM measurements at multiple frequencies and preselected amplitudes. However, none of these patents relates to the properties or effects of TMDs in subsurface measurements.

Thus there remains a need for improved methods and apparatus for reducing or eliminating borehole effects associated with the flow of undesired axial currents along the borehole when using logging instruments implemented with TMDs.

2. SUMMARY OF THE INVENTION

The invention provides an apparatus for measuring a property of an earth formation traversed by a borehole. The apparatus comprises an elongated support having a longitudinal axis; a plurality of antennas disposed on the support such that the magnetic dipole moments of the antennas are tilted or perpendicular with respect to the longitudinal axis of the support. The antennas are adapted to transmit and/or receive electromagnetic energy. The apparatus also includes means for conducting alternating current through at least one of the plurality of antennas to transmit electromagnetic energy; at least one sensor adapted to measure an electrical current value when at least one antenna of the plurality of antennas is transmitting electromagnetic energy; means for calculating a factor from the measured current value; and means for scaling the alternating current by the factor.

The invention provides an apparatus for measuring a property of an earth formation traversed by a borehole, comprising an elongated support having a longitudinal axis; a plurality of antennas disposed on the support such that the magnetic dipole moments of the antennas are tilted or perpendicular with respect to the longitudinal axis of the support, the antennas being adapted to transmit and/or receive electromagnetic energy; means for conducting alternating current through at least one antenna of the plurality of antennas to transmit electromagnetic energy; at least one sensor disposed on the support, each at least one sensor adapted to measure an electrical current value when at least one antenna of the plurality of antennas is transmitting electromagnetic energy; means for calculating a factor from a spacing, along the axis of the support, between a selected one of the plurality of antennas and a predetermined point on the support; and means for scaling the alternating current by the factor.

The invention provides a method for measuring a property of an earth formation traversed by a borehole, comprising passing alternating current through at least one antenna of a plurality of antennas disposed within the borehole to transmit electromagnetic energy, the antennas being disposed such that the magnetic dipole moments of the antennas are tilted or perpendicular with respect to the borehole axis; measuring an electric current value associated with the transmitted energy with at least one sensor disposed within the borehole; calculating a factor from the measured current value; passing alternating current scaled by the factor through at least one antenna of the plurality of antennas to transmit electromagnetic energy; receiving a voltage induced by the transmitted electromagnetic energy with at least one antenna of the plurality of antennas; and calculating the property from the received voltage.

The invention provides a method for measuring a property of an earth formation traversed by a borehole, comprising disposing a plurality of antennas within the borehole such that the magnetic dipole moments of the antennas are tilted or perpendicular with respect to the borehole axis; disposing at least one current sensor within the borehole; calculating factors from spacings, along the direction of the borehole, between selected ones of the plurality of antennas and predetermined points along the borehole; selectively passing alternating currents selectively scaled by the factors through selected ones of the plurality of antennas to transmit electromagnetic energy; calculating at least one factor from a current value measured at the at least one current sensor, the current value being associated with the transmitted electromagnetic energy; passing alternating current scaled by the at least one factor through at least one antenna of the plurality of antennas to transmit electromagnetic energy; receiving voltages induced by the transmitted electromagnetic energy with at least one antenna of the plurality of antennas; and calculating the property from the received voltages.

The invention provides a method for measuring a property of an earth formation traversed by a borehole, comprising disposing a plurality of antennas within the borehole such that the magnetic dipole moments of the antennas are tilted or perpendicular with respect to the borehole axis; disposing at least one current sensor within the borehole; calculating factors from spacings, along the direction of the borehole, between selected ones of the plurality of antennas and predetermined points along the borehole; selectively passing alternating currents selectively scaled by the factors through selected ones of the plurality of antennas to transmit electromagnetic energy; measuring electric current values associated with the transmitted energy at the at least one sensor; and calculating the property from the measured current values.

3. BRIEF DESCRIPTION OF THE DRAWINGS

Other aspects and advantages of the invention will become apparent upon reading the following detailed description and upon reference to the drawings in which.

4. DETAILED DESCRIPTION OF SPECIFIC EMBODIMENTS

Figure 2:
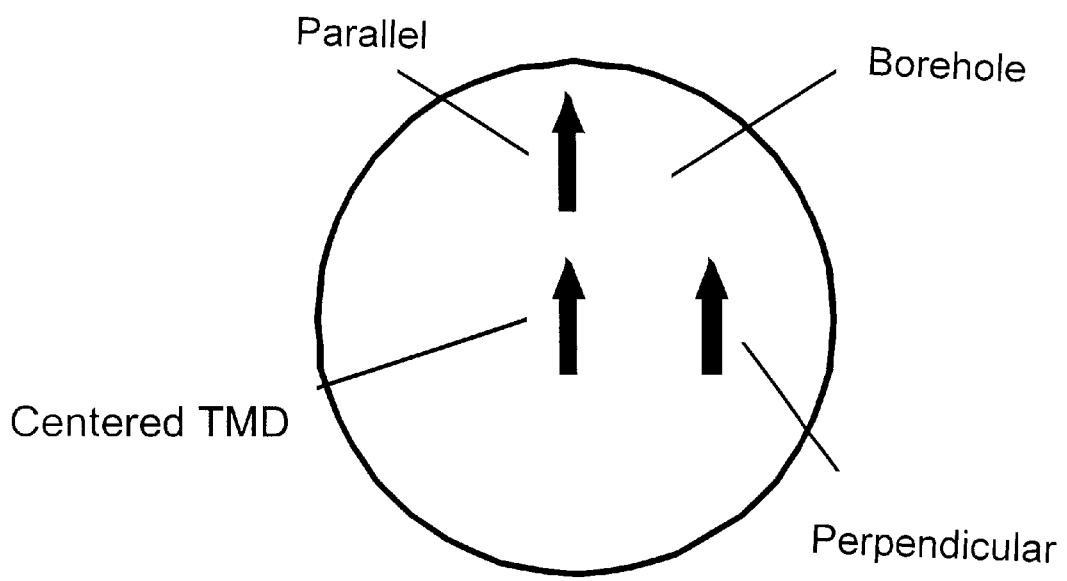
FIG. 2 shows a pictorial looking downhole of parallel and perpendicular eccentering of a tilted or transverse magnetic dipole within a borehole.

A TMD can be eccentered in a borehole in two possible orientations, which we will call parallel and perpendicular eccentering as shown in FIG. 2. Parallel eccentering forces currents symmetrically up and down the borehole and therefore no net current is generated. This borehole effect is no worse than in a typical instrument equipped with non-tilted (axial) antennas. Perpendicular eccentering gives rise to a large axial borehole current, which can strongly couple to a transverse receiver an axial distance away (not shown). These two displacements are the extremes of the possible ones. In the general case, the eccentering will be in a direction that is at some angle to the dipole moment of the sensors. In this case, the borehole effect lies between the two extreme cases.

Figure 3A:
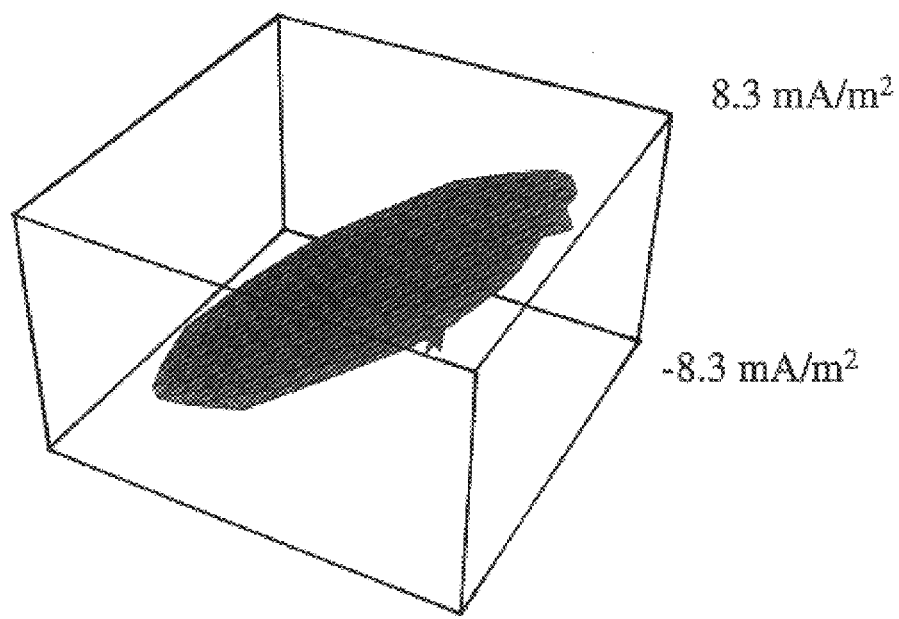
FIG. 3a shows a computed plot of an electric current density from a parallel eccentered tilted or transverse magnetic dipole within a borehole.
Figure 3B:
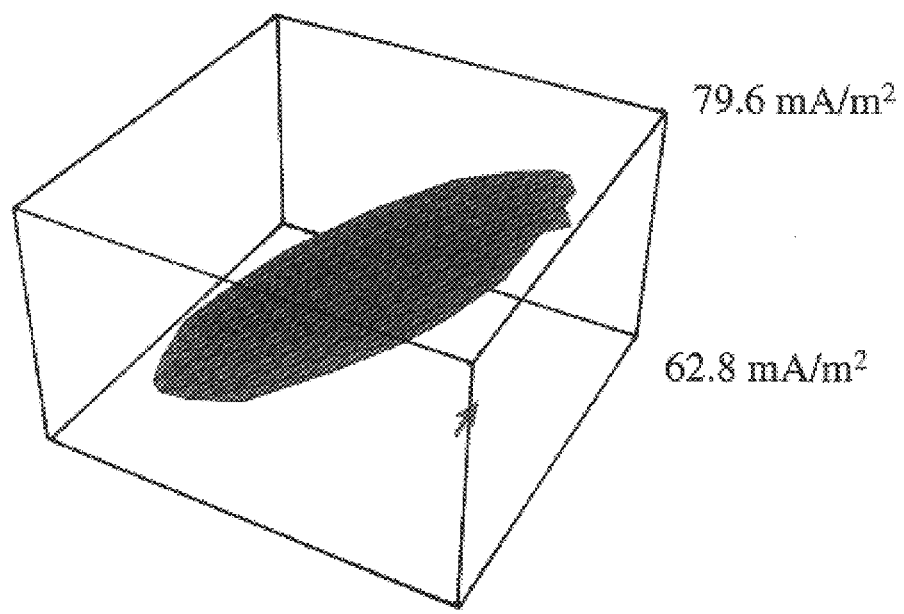
FIG. 3b shows a computed plot of an electric current density from a perpendicularly eccentered tilted or transverse magnetic dipole within a borehole.
Figure 4A:
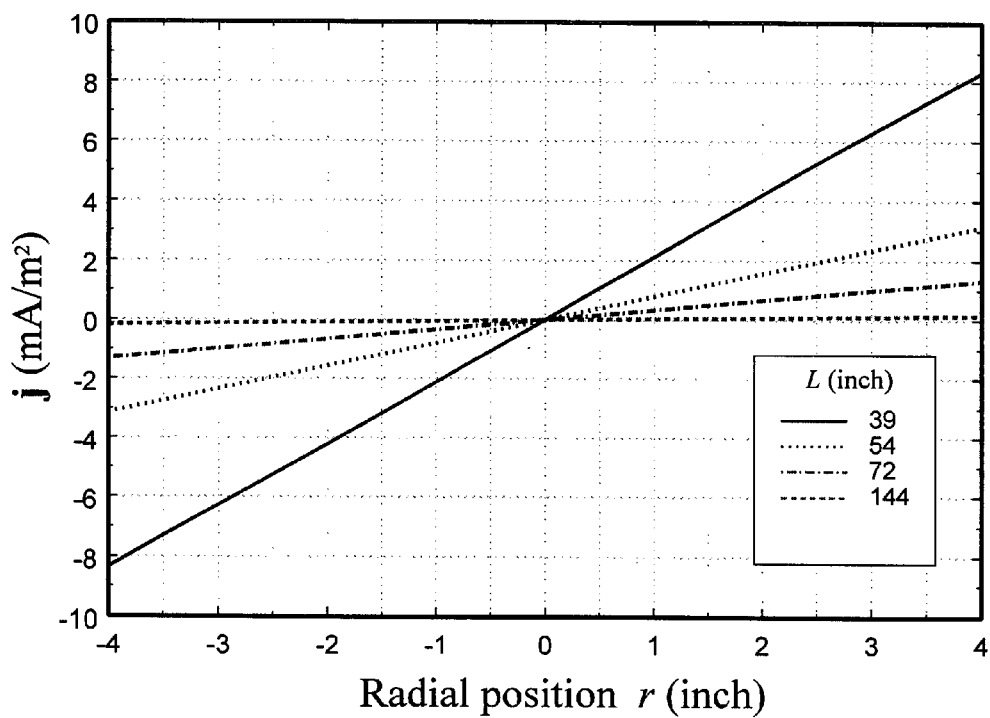
FIG. 4a shows a computed plot of the longitudinal electric current density along the diameter perpendicular to the orientation of the magnetic dipole of FIG. 3a corresponding to various source-to-receiver spacings.
Figure 4B:
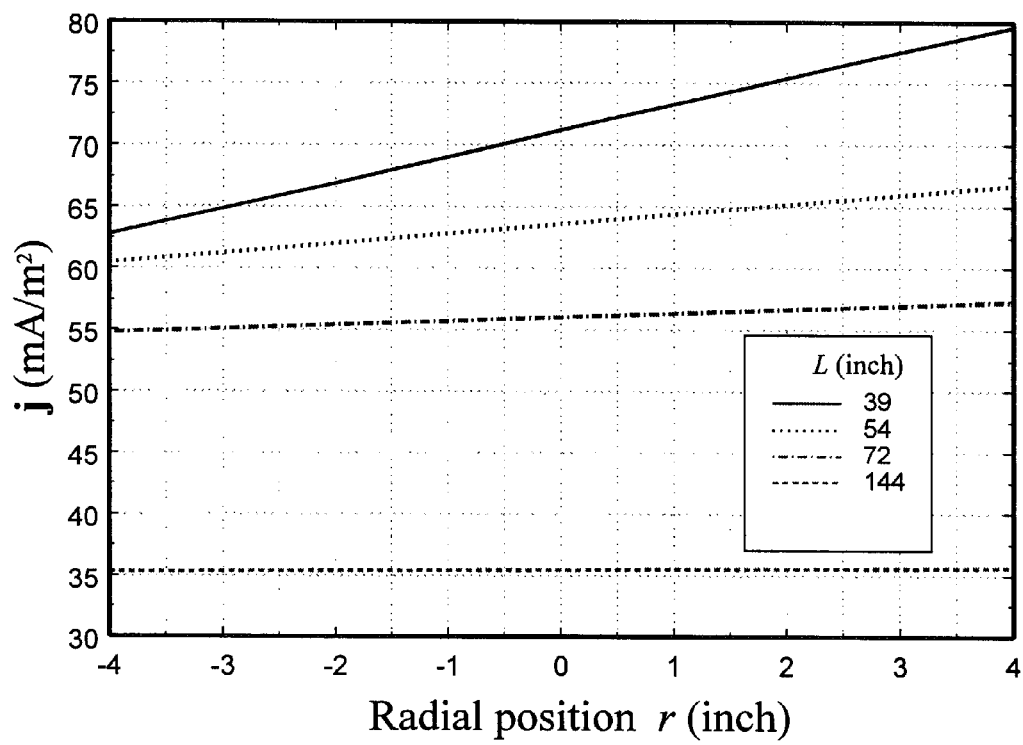
FIG. 4b shows a computed plot of the longitudinal electric current density along the diameter perpendicular to the orientation of the magnetic dipole of FIG. 3b corresponding to various source-to-receiver spacings.

Analysis has shown that in the conductive borehole, the effect of perpendicular eccentricity is at least two orders of magnitude higher than for parallel eccentricity. The cause of that phenomenon is appearance of zeroth order modes $TM_{0n}$, corresponding to the longitudinal (z-directed) current flowing in the borehole. FIGS. 3a and 3b respectively depict the current distributions from a parallel eccentered TMD and a perpendicular eccentered TMD in a borehole with an 8-inch diameter. The sources are positioned at a point 2-inches from the center. Mud resistivity is $R_m=1$ ohm-m, and formation resistivity is $R_t=1000$ ohm-m. The variation of current in the direction of the source is very small. The current due to the perpendicular TMD eccentricity is equal to current due to parallel TMD eccentricity, corresponding to the first order mode $TM_{1n}$, plus a constant term corresponding to zeroth order mode $TM_{0n}$. FIGS. 4a–4b show the longitudinal electric current densities along the diameter perpendicular to the orientation of the TMD. FIG. 4a shows the current density from the parallel eccentered TMD and FIG. 4b shows the density from the perpendicularly eccentered TMD. The fields were computed for transmitter to receiver spacings L=39, 54, 72 and 144 inches.

Modeling has shown that the $TM_{1n}$ mode has geometric dependence $1/L^3$. Therefore, mutual balancing of the TMD instrument effectively eliminates that mode and reduces the borehole eccentricity effect for parallel TMDs. On the other hand, the $TM_{0n}$ mode has more complicated $\exp\{-C\sqrt{(R_m/R_t)}L\}$ dependence, where C is a constant. Elimination of this mode entails more than geometrical relations. It means that a current (electric field) measurement as well as a voltage (magnetic field) measurement is important to proper formation evaluation.

In description of the techniques of the invention, the following notation is used:

$T_i$—i-th transmitter.

$R_j$—j-th receiver (H-sensor, flux of magnetic field). Corresponding number of turns is $N_j$.

$i_j$—j-th current sensor ($E_z$-sensor, z component of the electric field).

$r_{ij}$—distance between i-th transmitter and j-th receiver along a longitudinal support.

$l_{ij}$—distance between i-th transmitter and j-th current sensor along a longitudinal support.

$R_t/R_m$—resistivity contrast.

Figure 5:
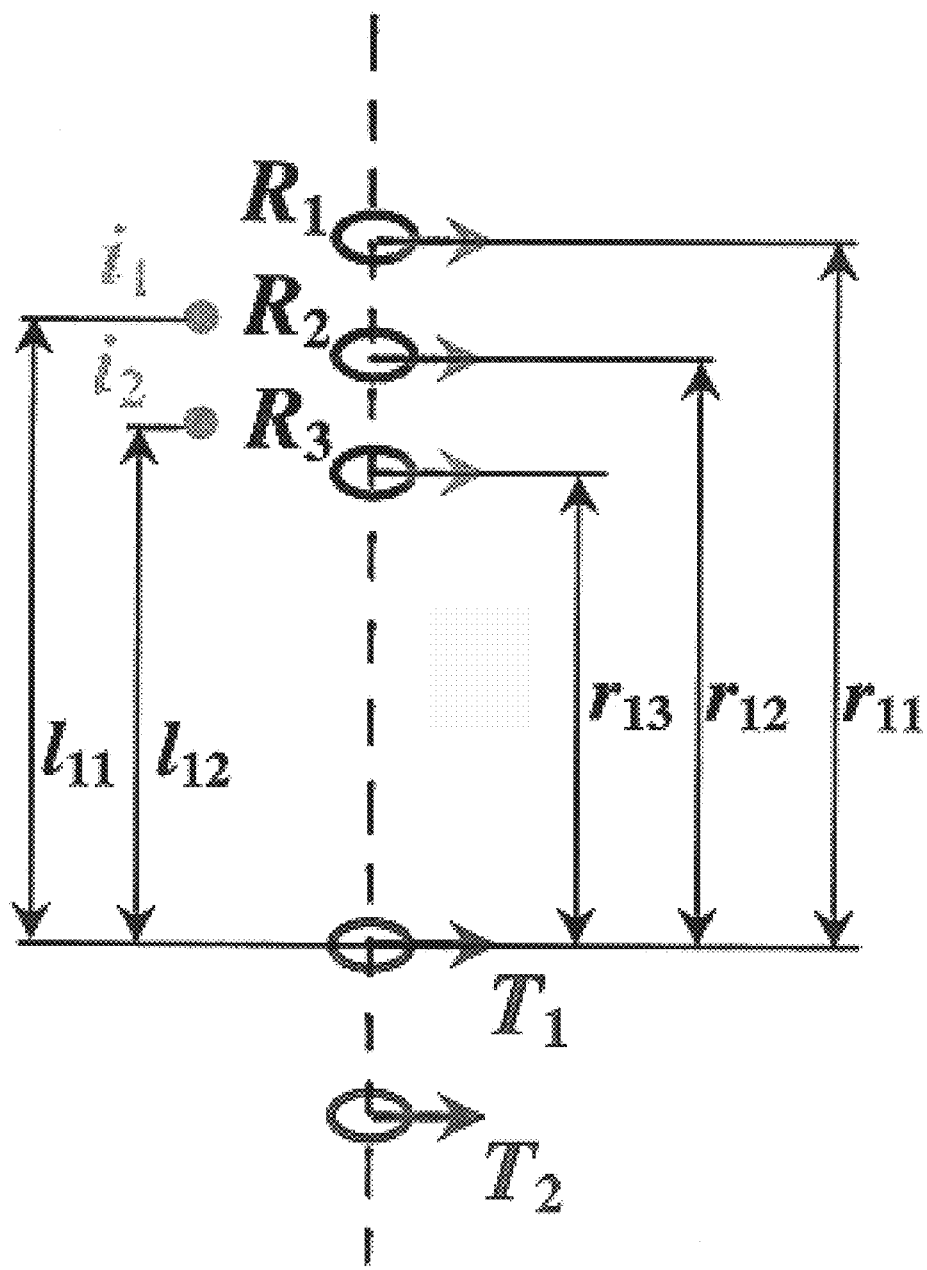
FIG. 5 is a schematic diagram of a logging instrument configuration according to the invention.

Focusing configuration 1: Turning to FIG. 5, an embodiment of the invention is shown. A TMD instrument configuration includes two transmitters $T_1$, $T_2$, three receivers $R_1$, $R_2$, $R_3$. and two current sensors $i_1$, $i_2$. For clarity of illustration, the actual support member of the instrument is not shown. It will be understood by those skilled in the art that practically any logging instrument, having an elongated support (depicted by the dashed line), may be used to implement the invention. The current sensors may consist of toroidal electrodes or button electrodes as known in the art. U.S. Pat. Nos. 5,235,285 and 5,339,037 (both assigned to the present assignee and incorporated herein by reference) describe sensors that may be used with the invention. The antennas and sensors of the invention are mounted on the support by suitable means and operated by electronics systems well known in the art such as described in the '285 and '037 patents.

The three receivers $R_1$, $R_2$, $R_3$ are mutually balanced with both transmitters $T_1$, $T_2$, that is, $$\sum_{j=1}^{3} \frac{N_j}{(r_{ij})^3} = 0, \text{ for } i = 1, 2 \quad (1)$$

or, $$\frac{N_3}{N_1} = -\frac{\left(\frac{r_{12}}{r_{11}}\right)^3 - \left(\frac{r_{22}}{r_{21}}\right)^3}{\left(\frac{r_{12}}{r_{13}}\right)^3 - \left(\frac{r_{21}}{r_{23}}\right)^3} \frac{N_2}{N_1} = -\frac{\left(\frac{r_{13}}{r_{11}}\right)^3 - \left(\frac{r_{23}}{r_{21}}\right)^3}{\left(\frac{r_{13}}{r_{12}}\right)^3 - \left(\frac{r_{23}}{r_{22}}\right)^3}. \quad (2)$$

In expressions (1) and (2), $N_i$ are number of turns, and they include the polarity of the antennas (i.e., may be negative numbers).

Figure 1:
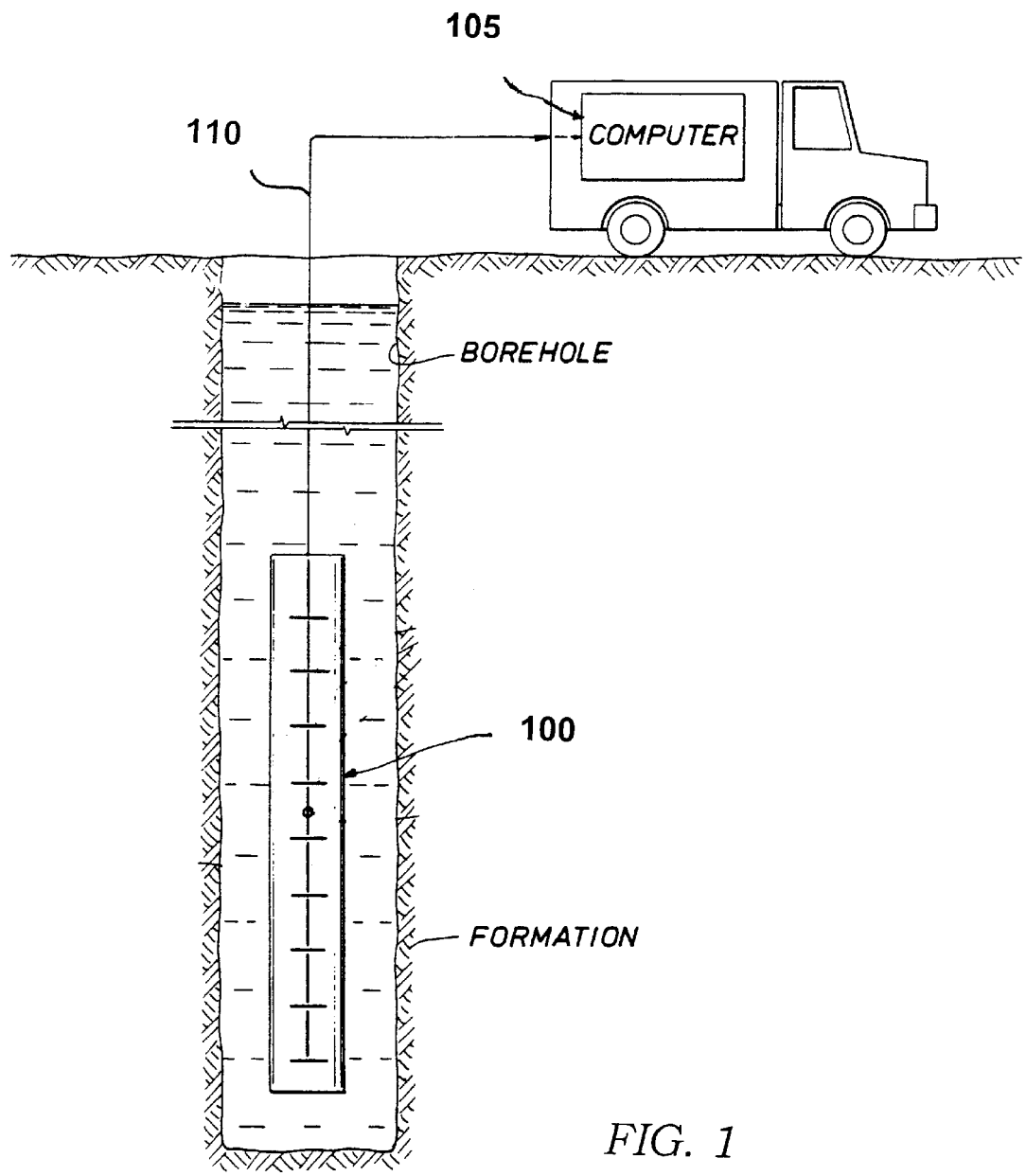
FIG. 1 is a schematic diagram of a well logging system comprising a logging instrument disposed in a borehole.

An embodiment of the invention is a process implemented with the instrument configuration of FIG. 5. In this process, an alternating current is passed through one of the antennas $T_1$, $T_2$ to transmit EM energy through the borehole and into the formation. Although typical EM logging tools are operated at frequencies in the range of about 100 Hz to 5 MHz, the techniques of the present invention are not limited to any particular current frequency. The current is supplied to the antenna(s) by a signal generator mounted within the instrument as known in the art (not shown), or it may be fed to the instrument through a wireline cable as shown in FIG. 1.

If transmitter $T_1$ is activated to transmit EM energy, transmitter $T_2$ is off and vice-versa. With $T_1$ activated, the current induced along the borehole is measured by the sensors $i_1$, $i_2$. The current associated with $T_1$ is expressed as $$i^{(1)} = i_1^{(1)} - \left(\frac{l_{12}}{l_{11}}\right)^3 i_2^{(1)}. \quad (3)$$

The active transmitter $T_1$ is then shut off and an alternating current of the same parameters (i.e., same phasor current) is passed through the other transmitter $T_2$ to emit EM energy. The current induced by transmitter $T_2$ is measured by the sensors $i_1$, $i_2$. This current is expressed as $$i^{(2)} = i_1^{(2)} - \left(\frac{l_{22}}{l_{21}}\right)^3 i_2^{(2)}. \quad (4)$$

A scaling factor $\alpha = -i^{(1)}/i^{(2)}$ is calculated from equations (3) and (4). An alternating current (phasor current) is scaled by the scaling factor $\alpha$ and passed through transmitter $T_2$ while transmitter $T_1$ is simultaneously energized with an alternating current having the previous unscaled parameters. The voltage signals induced by the transmitted energy is detected and received at one or all three receivers $R_1$, $R_2$, $R_3$. One of many known techniques (e.g., models, look-up tables, algorithms) may then be applied to the received voltage signals to calculate the formation resistivity.

The scaling performed in equations (3) and (4) is used to eliminate the current corresponding to first order mode $TM_{1n}$. It insures that the current measurement is independent of the radial position of the antenna. Therefore, currents $i^{(1)}$ and $i^{(2)}$ correspond to mode $TM_{0n}$. In this particular process exponential dependence of zero-th mode current $\exp\{-C\sqrt{(R_m/R_t)}L\}$ is not taken into account.

Figure 6:
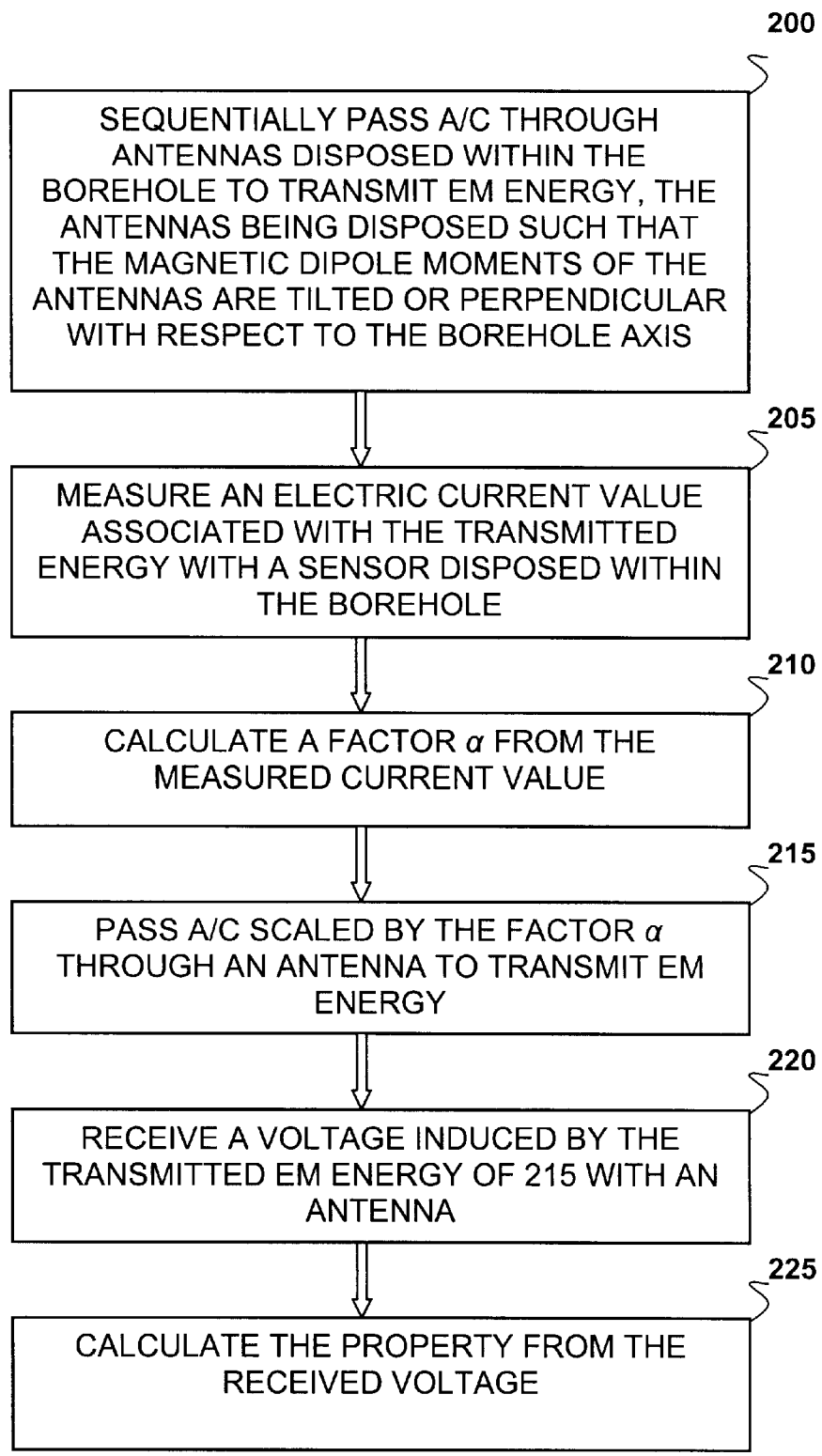
FIG. 6 shows a flow chart of a method according to the invention.

FIG. 6 shows a flow chart summarizing the steps of the process described above. At 200, an alternating current is sequentially passed through at least two antennas of a plurality of antennas disposed within a borehole to transmit electromagnetic energy, the antennas being disposed such that the magnetic dipole moments of the antennas are tilted or perpendicular with respect to the borehole axis. An electric current value associated with the transmitted energy is measured with at least one sensor disposed within the borehole at 205. A factor $\alpha$ is calculated from the measured current value at 210. Alternating current scaled by the factor $\alpha$ is passed through at least one of the antennas to transmit electromagnetic energy at 215. At 220, a voltage induced by the transmitted electromagnetic energy (at 215) is received with one of the antennas. A property (resistivity) of the earth formation is then calculated from the received voltage at 225.

Figure 7:
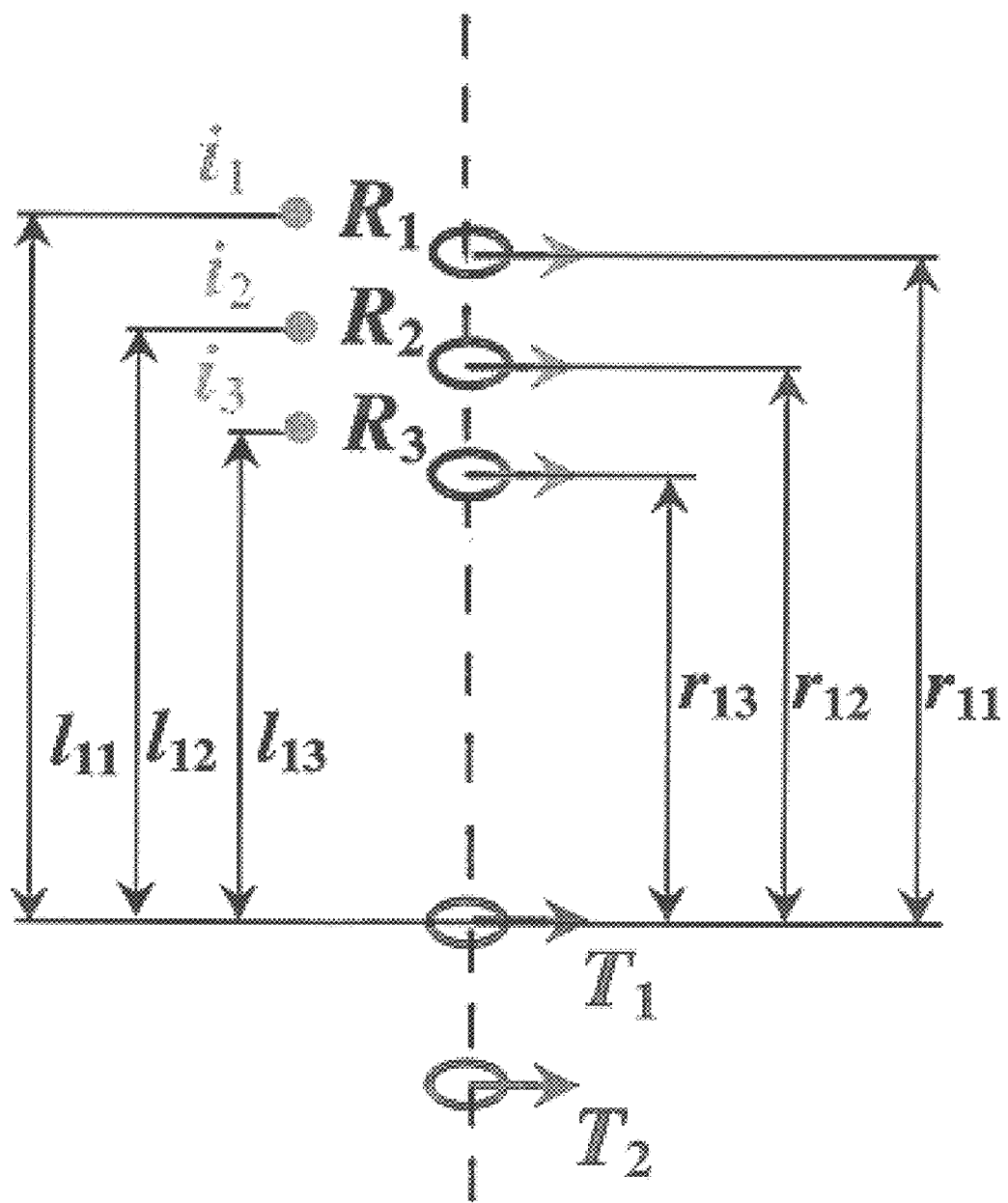
FIG. 7 is a schematic diagram of a logging instrument configuration according to the invention.

Focusing configuration 2: FIG. 7 shows another embodiment of the invention. A TMD instrument configuration includes two transmitters $T_1$, $T_2$, three receivers $R_1$, $R_2$, $R_3$, and three current sensors $i_1$, $i_2$, $i_3$. Compared to the embodiment of FIG. 5, this embodiment has one more current sensor. This embodiment may be implemented using the same process described above, forcing the total current measured by the three current sensors to be zero. The third current sensor allows estimation of zero-th order mode, and rough estimation of resistivity contrast.

Another embodiment of the invention is a process implemented with the instrument configuration of FIG. 7. Provided the mud resistivity $R_m$ is known (which may be determined from a sample or other known means), a first estimate of $R_t$ may be derived. In this process, the distances between selected transmitter antennas $T_1$, $T_2$ and selected current sensors $i_1$, $i_2$, $i_3$ are determined and several scaling factors are calculated from these spacings. An alternating current of known parameters is passed through $T_1$ while an alternating current scaled by a factor $-(l_{21}/l_{11})^3$ is simultaneously passed though transmitter $T_2$ to transmit EM energy. The current induced along the borehole is measured by the first sensor $i_1$. The current associated with $T_1$ and $T_2$ is expressed as $$i_1 = i_1^{(1)} - \left(\frac{l_{21}}{l_{11}}\right)^3 i_1^{(2)} = i_{1,0}^{(1)} - \left(\frac{l_{21}}{l_{11}}\right)^3 i_{1,0}^{(2)} = i_{1,0}. \quad (5)$$

The measured current $i_1$ has only the zero-th order mode $i_{1,0}$ if the transmitters are spaced sufficiently far apart. Currents $i_1^{(1)}$ and $i_1^{(2)}$ correspond to transmitters excited by the unscaled current.

Next, an alternating current of known parameters is again passed through transmitter $T_1$ while an alternating current scaled by a factor $-(l_{22}/l_{12})^3$ is simultaneously passed through transmitter $T_2$. The current induced along the borehole is measured by the second sensor $i_2$. This current associated with $T_1$ and $T_2$ is expressed as $$i_2 = i_2^{(1)} - \left(\frac{l_{22}}{l_{12}}\right)^3 i_2^{(2)} = i_{2,0}^{(1)} - \left(\frac{l_{22}}{l_{12}}\right)^3 i_{2,0}^{(2)} = i_{2,0}. \quad (6)$$

Next, an alternating current of the known parameters is again passed through transmitter $T_1$ while an alternating current scaled by a factor $-(l_{23}/l_{13})^3$ is simultaneously passed though transmitter $T_2$. The current induced along the borehole is measured by the third sensor $i_3$. This current associated with $T_1$ and $T_2$ is expressed as $$i_3 = i_3^{(1)} - \left(\frac{l_{23}}{l_{13}}\right)^3 i_3^{(2)} = i_{3,0}^{(1)} - \left(\frac{l_{23}}{l_{13}}\right)^3 i_{3,0}^{(2)} = i_{3,0}. \quad (7)$$

Assuming $\exp\{-C\sqrt{R_m/R_t}L\}$ dependence of the zero-th order mode current, the following relations may be written, $$i_{2,0}^{(1)} = i_{1,0}^{(1)} e^{-C\sqrt{R_m/R_t}(l_{12}-l_{11})} \quad (8)$$
$$i_{2,0}^{(2)} = i_{1,0}^{(2)} e^{-C\sqrt{R_m/R_t}(l_{12}-l_{11})}$$
$$i_{3,0}^{(1)} = i_{1,0}^{(1)} e^{-C\sqrt{R_m/R_t}(l_{13}-l_{11})}$$
$$i_{3,0}^{(2)} = i_{1,0}^{(2)} e^{-C\sqrt{R_m/R_t}(l_{13}-l_{11})}$$

Substituting expression (8) into (6)-(7) gives the following system of equations $$i_{1,0} = i_{1,0}^{(1)} - i_{1,0}^{(2)}\left(\frac{l_{21}}{l_{11}}\right)^3 \quad (9)$$

$$i_{2,0} = \left\{i_{1,0}^{(1)} - i_{1,0}^{(2)}\left(\frac{l_{21}}{l_{11}}\right)^3\right\} e^{-C\sqrt{R_m/R_t}(l_{12}-l_{11})}$$

$$i_{3,0} = \left\{i_{1,0}^{(1)} - i_{1,0}^{(2)}\left(\frac{l_{23}}{l_{13}}\right)^3\right\} e^{-C\sqrt{R_m/R_t}(l_{13}-l_{11})}$$

After eliminating $i^{(1)}$ and $i^{(2)}$, it is possible to write an expression in terms of resistivity contrast $R_m/R_t$, $$i_{1,0}\left\{\left(\frac{l_{22}}{l_{12}}\right)^3 - \left(\frac{l_{23}}{l_{13}}\right)^3\right\} = i_{2,0}\left\{\left(\frac{l_{21}}{l_{11}}\right)^3 - \left(\frac{l_{23}}{l_{13}}\right)^3\right\} e^{-C\sqrt{R_m/R_t}(l_{12}-l_{11})} - \quad (10)$$
$$i_{3,0}\left\{\left(\frac{l_{21}}{l_{11}}\right)^3 - \left(\frac{l_{22}}{l_{12}}\right)^3\right\} e^{-C\sqrt{R_m/R_t}(l_{13}-l_{11})}.$$

The only unknown in equation (10) is $R_t$ and it can be obtained using standard methods for solution of nonlinear equations.

Figure 8:
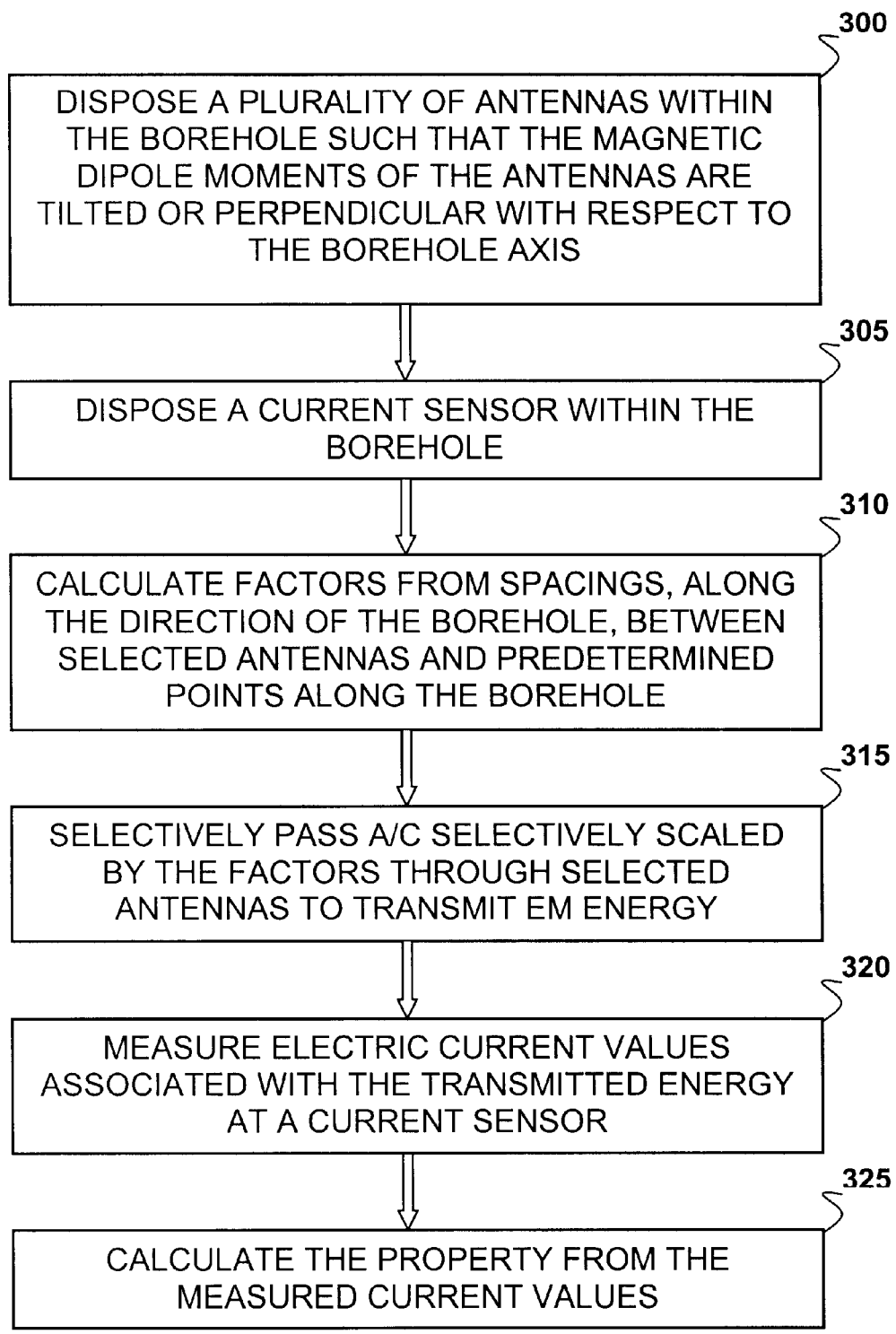
FIG. 8 shows a flow chart of a method according to the invention.

FIG. 8 shows a flow chart outlining the steps of the process described above. At 300, a plurality of antennas is disposed within a borehole such that the magnetic dipole moments of the antennas are tilted or perpendicular with respect to the borehole axis. At least one current sensor is disposed within the borehole at 305. Factors from spacings along the direction of the borehole are calculated between selected antennas and predetermined points along the borehole at 310. At 315, alternating currents selectively scaled by the factors are selectively passed through selected antennas to transmit electromagnetic energy. At 320, electric current values associated with the transmitted energy are measured at a sensor. A property (resistivity) of the formation is then calculated from the measured current values at 325.

Figure 9:
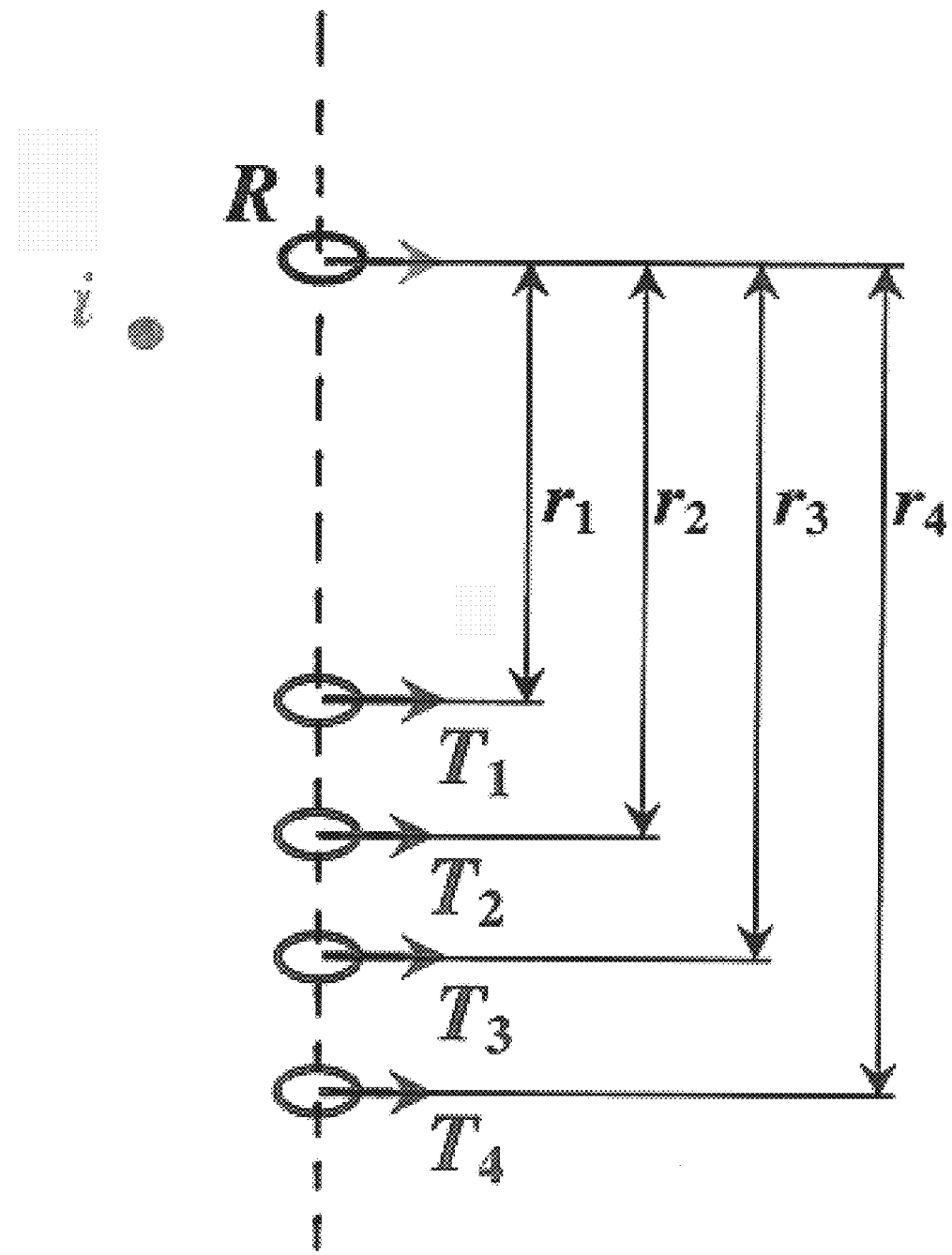
FIGS. 9–10 are schematic diagrams of logging instrument configurations according to the invention.

Focusing configuration 3: Turning to FIG. 9, another embodiment of the invention is shown. A TMD instrument configuration includes four transmitters $T_1$, $T_2$, $T_3$, $T_4$, one receiver $R_1$, and one current sensor $i_1$. The current sensor and receiver are preferably at substantially the same distance from the transmitters along the longitudinal axis of the support.

Another embodiment of the invention is a process implemented with the instrument configuration of FIG. 9. In this process, the distances between selected antennas $T_1$, $T_2$, $T_3$, $T_4$ are determined and several scaling factors are calculated from these spacings. An alternating current of known parameters is passed through $T_1$ while an alternating current scaled by a factor $-(r_2/r_1)^3$ is simultaneously passed though transmitter $T_2$. The current induced along the borehole is detected and measured at the sensor $i_1$. The current associated with $T_1$ and $T_2$ is expressed as $$i_1 = i_1^{(1)} - \left(\frac{r_2}{r_1}\right)^3 i_1^{(2)}. \tag{11}$$

The measured current $i_1$ has only the zero-th order mode if the transmitters are spaced sufficiently far apart. Currents $i^{(1)}$ and $i^{(2)}$ correspond to transmitters excited by the unscaled current.

Next, an alternating current of the known parameters is passed through transmitter $T_3$ while an alternating current scaled by a factor $-(r_4/r_3)^3$ is simultaneously passed through transmitter $T_4$. The current induced along the borehole is measured by the sensor $i_1$. The current associated with $T_3$ and $T_4$ is expressed as $$i_2 = i_2^{(3)} - \left(\frac{r_4}{r_3}\right)^3 i_2^{(4)}. \tag{12}$$

Again, measured currents have only the zero-th order mode if the transmitters are spaced sufficiently far apart. Currents $i^{(3)}$ and $i^{(4)}$ correspond to transmitters excited by the unscaled current.

Next, an alternating current of the known parameters is again passed through transmitter $T_1$ while an alternating current scaled by a factor $-(r_2/r_1)^3$ is simultaneously passed through transmitter $T_2$, an alternating current scaled by a factor $\alpha$ is passed through $T_3$, and an alternating current scaled by a factor $\alpha (r_4/r_3)^3$ is passed through $T_4$. The scaling factor $\alpha$ is adjusted by forcing the total current to zero $$i=i_1+\alpha i_2=0. \tag{13}$$

Figure 10:
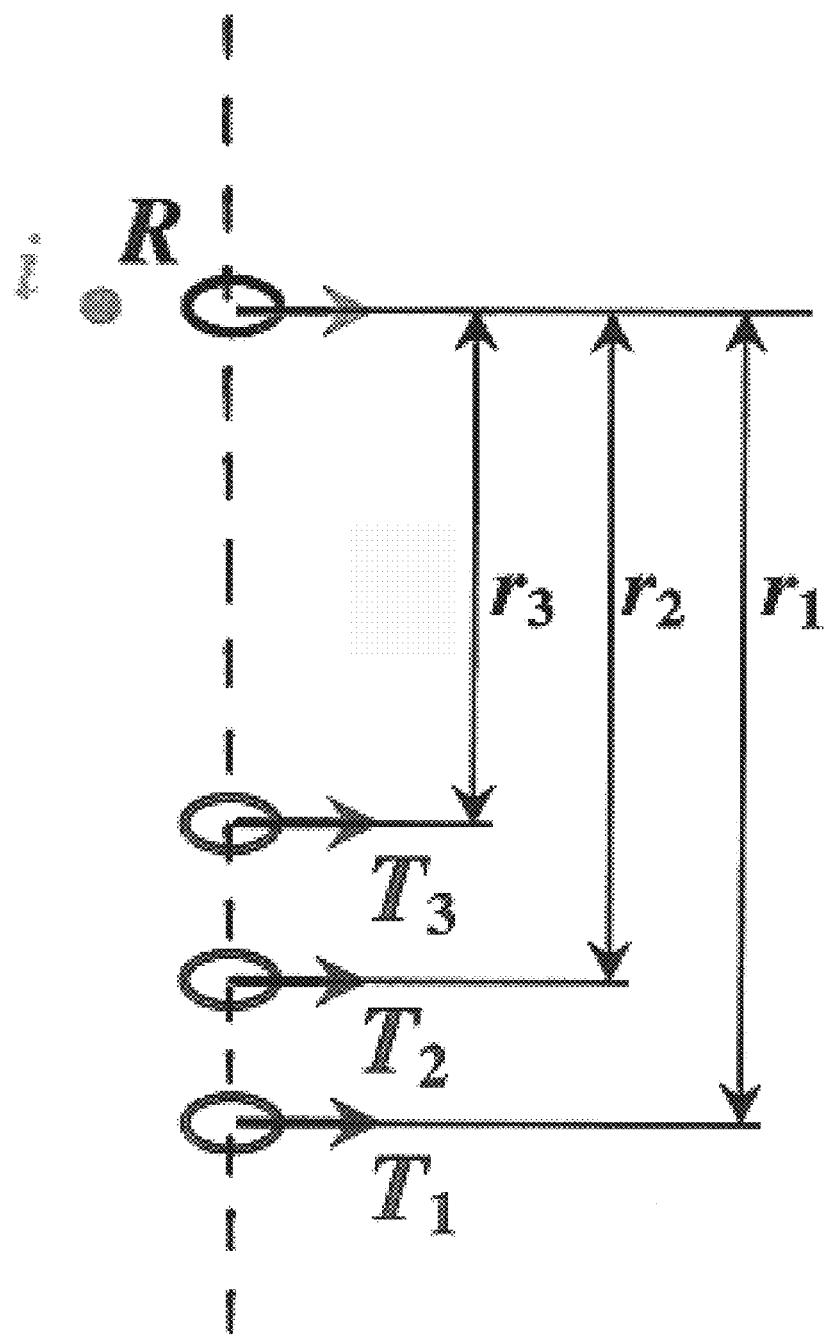

Focusing configuration 4: FIG. 10 shows another embodiment of the invention. A TMD instrument configuration includes three transmitters $T_1$, $T_2$, $T_3$, one receiver $R_1$, and one current sensor $i_1$. The current sensor and receiver are at substantially the same distance from the transmitters along the longitudinal axis of the instrument.

Another process of the invention is implemented with the embodiment of FIG. 10. In this process, the distances between selected antennas $T_1$, $T_2$, $T_3$, are determined and several scaling factors are calculated from these spacings. An alternating current of known parameters is passed through $T_1$ while an alternating current scaled by a factor $-(r_2/r_1)^3$ is simultaneously passed through transmitter $T_2$. The current induced along the borehole is detected and measured at the sensor $i_1$. The current associated with $T_1$ and $T_2$ is expressed as $$i_1 = i_1^{(1)} - \left(\frac{r_2}{r_1}\right)^3 i_1^{(2)}. \tag{14}$$

Again, the current measured has only the zeroth order mode if the transmitters are sufficiently spaced far apart. Currents $i_1^{(1)}$ and $i_1^{(2)}$ correspond to transmitters excited by the unscaled current.

Next, an alternating current of known parameters is passed through $T_2$ while an alternating current scaled by a factor $-(r_3/r_2)^3$ is simultaneously passed through transmitter $T_3$. The current induced along the borehole is detected and measured at the sensor $i_1$. The current associated with $T_2$ and $T_3$ is expressed as $$i_2 = i_2^{(2)} - \left(\frac{r_3}{r_2}\right)^3 i_2^{(3)}. \tag{15}$$

Currents $i_2^{(2)}$ and $i_2^{(3)}$ correspond to transmitters excited by the current of known parameters.

Next, an alternating current of the known parameters is again passed through transmitter $T_1$ while an alternating current scaled by a factor $-\{\alpha+(r_2/r_1)^3\}$ is simultaneously passed through transmitter $T_2$ and an alternating current scaled by a factor $\alpha(r_3/r_2)^3$ is passed through $T_3$. The scaling factor $u$ is adjusted by forcing the total current to zero $$i=i_1+\alpha i_2=0 \tag{16}$$

Figure 11:
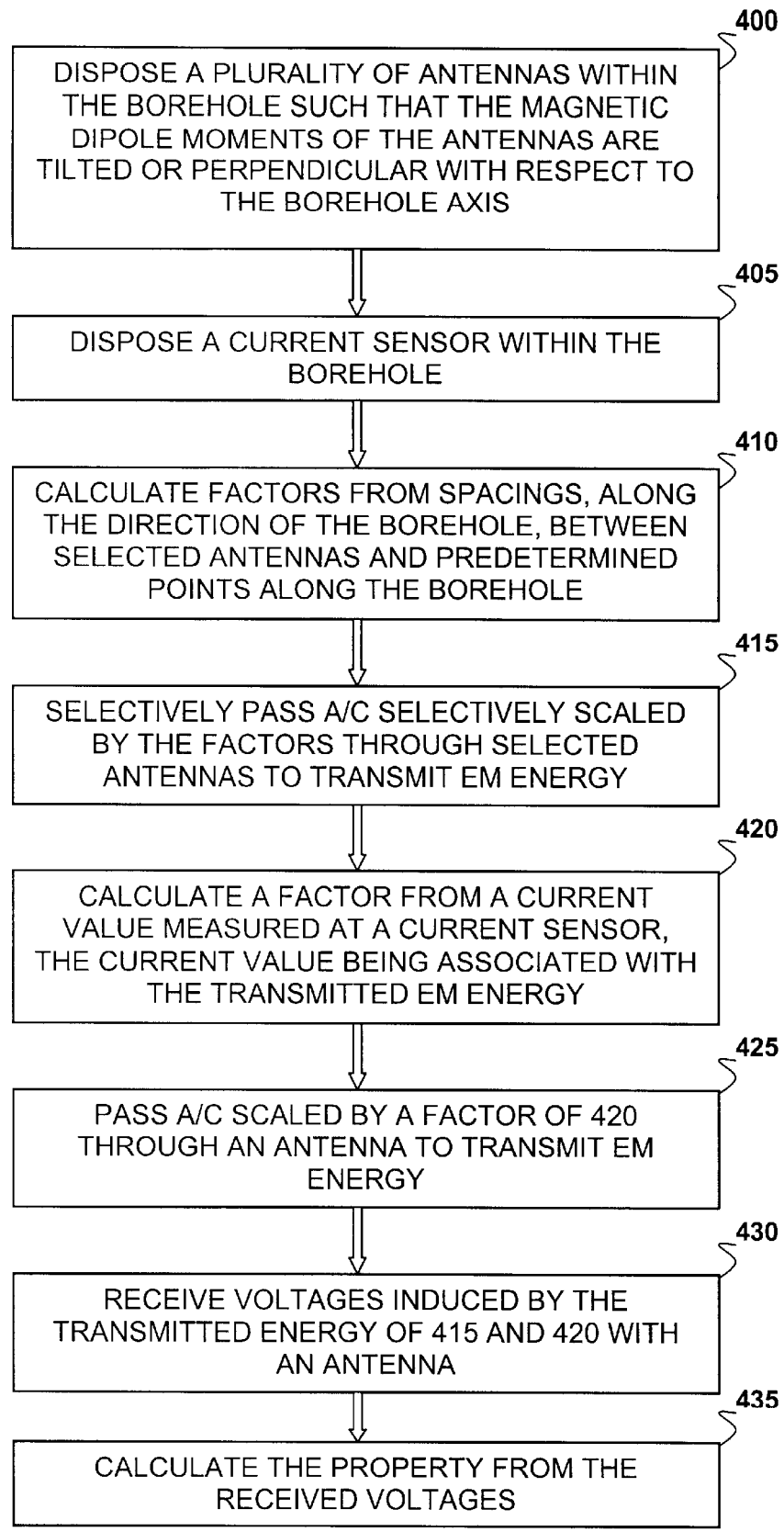
FIG. 11 shows a flow chart of a method according to the invention.

FIG. 11 shows a flow chart outlining the steps of a process of the invention according to Focusing configurations 2–4 described above. At 400, a plurality of antennas are disposed within a borehole such that the magnetic dipole moments of the antennas are tilted or perpendicular with respect to the borehole axis. At least one current sensor is disposed within the borehole at 405. At 410, factors from spacings along the direction of the borehole are calculated between selected antennas and predetermined points along the borehole. Alternating currents selectively scaled by the calculated factors are selectively passed through selected antennas to transmit electromagnetic energy at 415. At 420, at least one factor is calculated from a current value measured at a current sensor, the current value being associated with the transmitted electromagnetic energy. Alternating current scaled by a factor (at 420) is passed through at least one antenna to transmit electromagnetic energy at 425. At 430, voltages induced by the transmitted electromagnetic energy (at 420 and 425) are received at an antenna. A property (resistivity) of the earth formation is then calculated from the received voltages at 435.

While the methods and apparatus of this invention have been described as specific embodiments, it will be apparent to those skilled in the art that other embodiments of the invention can be readily devised which do not depart from the concept and scope of the invention as disclosed herein. For example, the steps of the disclosed techniques can be performed electronically or by using the principle of superposition. All such similar variations apparent to those skilled in the art are deemed to be within the scope of the invention as defined by the appended claims.

What is claimed is:

1. An apparatus for measuring a property of an earth formation traversed by a borehole, comprising:

an elongated support having a longitudinal axis;

a plurality of antennas disposed on said support such that the magnetic dipole moments of said antennas are tilted or perpendicular with respect to the longitudinal axis of said support, said antennas being adapted to transmit and/or receive electromagnetic energy;

means for conducting alternating current through at least one of said plurality of antennas to transmit electromagnetic energy;

at least one sensor adapted to measure an electrical current value associated with a current in said borehole when at least one antenna of said plurality of antennas is transmitting electromagnetic energy;

means for calculating a mathematical factor from said measured current value; and means for mathematically scaling said alternating current by said factor.

2. The apparatus of claim 1, wherein said property is resistivity.

3. The apparatus of claim 1, wherein said alternating current comprises a range of 100 Hz to 5 MHz.

4. The apparatus of claim 1, said factor calculating means further comprising means for calculating said factor from a predetermined spacing, along said axis of said support, between a selected one of said plurality of antennas and said at least one sensor.

5. The apparatus of claim 1, wherein said apparatus comprises two sensors, each sensor adapted to measure an electrical current value associated with a current in said borehole when at least one antenna of said plurality of antennas is transmitting electromagnetic energy.

6. The apparatus of claim 5, wherein said factor calculating means comprises means for calculating said factor from current values measured at said two sensors.

7. An apparatus for measuring a property of an earth formation traversed by a borehole, comprising:
an elongated support having a longitudinal axis;
a plurality of antennas disposed on said support such that the magnetic dipole moments of said antennas are tilted or perpendicular with respect to the longitudinal axis of said support, said antennas being adapted to transmit and/or receive electromagnetic energy;
means for conducting alternating current through at least one antenna of said plurality of antennas to transmit electromagnetic energy;
at least one sensor disposed on said support, each at least one sensor adapted to measure an electrical current value associated with a current in said borehole when at least one antenna of said plurality of antennas is transmitting electromagnetic energy;
means for calculating a mathematical factor from a spacing, along said axis of said support, between a selected one of said plurality of antennas and a predetermined point on said support; and
means for mathematically said alternating current by said factor.

8. The apparatus of claim 7, wherein said property is resistivity.

9. The apparatus of claim 7, wherein said alternating current comprises a range of 100 Hz to 5 MHz.

10. The apparatus of claim 7, said factor calculating means further comprising means for calculating said factor from a current value measured at said at least one sensor.

11. The apparatus of claim 7, wherein said spacing comprises the distance between said selected antenna and said at least one sensor.

12. The apparatus of claim 7, wherein said spacing comprises the distance between said selected antenna and another antenna of said plurality of antennas.

13. A method for measuring a property of an earth formation traversed by a borehole, comprising:
a) sequentially passing alternating current through at least two antennas of a plurality of antennas disposed within said borehole to transmit electromagnetic energy, said antennas being disposed such that the magnetic dipole moments of said antennas are tilted or perpendicular with respect to the borehole axis;
b) measuring an electric current value associated with said transmitted energy with at least one sensor disposed within said borehole;
c) calculating a mathematical factor from said measured current value;
d) passing alternating current mathematically scaled by said factor though at least one antenna of said plurality of antennas to transmit electromagnetic energy;
e) receiving a voltage induced by said transmitted electromagnetic energy of step (d) with at least one antenna of said plurality of antennas; and
f) calculating said property from said received voltage.

14. The method of claim 13, wherein said property is resistivity.

15. The method of claim 13, wherein said alternating current comprises a range of 100 Hz to 5 MHz.

16. The method of claim 13, wherein step (c) includes calculating said factor from a predetermined spacing, along said borehole axis, between a selected one of said plurality of antennas and said at least one sensor.

17. The method of claim 13, wherein step (b) includes measuring electric current values associated with said transmitted energy at two sensors disposed within said borehole.

18. The method of claim 17, wherein step (c) includes calculating said factor from said current values measured at said two sensors.

19. A method for measuring a property of an earth formation traversed by a borehole, comprising:
a) disposing a plurality of antennas within said borehole such that the magnetic dipole moments of said antennas are tilted or perpendicular with respect to the borehole axis;
b) disposing at least one current sensor within said borehole;
c) calculating mathematical factors from spacings, along the direction of said borehole, between selected ones of said plurality of antennas and predetermined points along said borehole;
d) selectively passing alternating currents selectively and mathematically scaled by said factors through selected ones of said plurality of antennas to transmit electromagnetic energy;
e) calculating at least one mathematical factor from a current value measured at said at least one current sensor, said current value being associated with said transmitted electromagnetic energy;
f) passing alternating current mathematically sealed by said at least one factor of step (e) through at least one antenna of said plurality of antennas to transmit electromagnetic energy;
g) receiving voltages induced by said transmitted electromagnetic energy of steps (d) and (f) with at least one antenna of said plurality of antennas; and
h) calculating said property from said received voltages.

20. The method of claim 19, wherein said property is resistivity.

21. The method of claim 19, wherein said alternating current comprises a range of 100 Hz to 5 MHz.

22. The method of claim 19, wherein said spacings of step (c) comprise distances between said selected ones of said antennas and other antennas of said plurality of antennas.

23. The method of claim 19, wherein said spacings of step (c) comprise distances between said selected ones of said antennas and said at least one current sensor.

24. A method for measuring a property of an earth formation traversed by a borehole, comprising:
a) disposing a plurality of antennas within said borehole such that the magnetic dipole moments of said antennas are tilted or perpendicular with respect to the borehole axis;
b) disposing at least one current sensor within said borehole;
c) calculating mathematical factors from spacings, along the direction of said borehole, between selected ones of said plurality of antennas and predetermined points along said borehole;

d) selectively passing alternating currents selectively and mathematically scaled by said factors through selected ones of said plurality of antennas to transmit electromagnetic energy;

e) measuring electric current values associated with said transmitted energy at said at least one sensor; and f) calculating said property from said measured current values.

25. The method of claim 24, wherein said property is resistivity.

26. The method of claim 24, wherein said alternating current comprises a range of 100 Hz to 5 MHz.

27. The method of claim 24, wherein said spacings of step (c) comprise distances between said selected ones of said antennas and said at least one current sensor.

28. The method of claim 24, wherein said calculation of step (f) includes a resistivity value of a fluid within said borehole.

29. The method of claim 24, wherein said calculation of step (f) includes solving a nonlinear equation.

* * * * *